(12) United States Patent
Gutierrez et al.

(10) Patent No.: US 6,220,096 B1
(45) Date of Patent: Apr. 24, 2001

(54) DIFFERENTIAL WIDEBAND VIBRATION

(75) Inventors: Adolfo O. Gutierrez, Troy, NY (US);
Daniel M. Edmans, Socorro, NM (US);
Christopher Cormeau, San Diego, CA (US)

(73) Assignee: InterScience, Inc., Troy, NY (US)

( * ) Notice: Subject to any disclaimer, the term of this patent is extended or adjusted under 35 U.S.C. 154(b) by 0 days.

(21) Appl. No.: 09/253,490

(22) Filed: Feb. 19, 1999

Related U.S. Application Data

(63) Continuation-in-part of application No. 08/821,042, filed on Mar. 20, 1997, now Pat. No. 5,874,675.

(51) Int. Cl.$^7$ .................................................. G01P 15/13
(52) U.S. Cl. ......................................... 73/514.21; 73/654
(58) Field of Search ........................... 73/514.01, 514.16, 73/514.17, 514.18, 514.21, 514.29, 514.36, DIG. 1, 654, 649

(56) References Cited

U.S. PATENT DOCUMENTS

| | | | |
|---|---|---|---|
| 3,585,466 | * 6/1971 | Davis, Jr. et al. | 257/254 |
| 4,841,775 | 6/1989 | Ikeda et al. | 73/704 |
| 4,873,871 | 10/1989 | Bai et al. | 73/777 |
| 5,001,933 | 3/1991 | Brand | 73/651 |
| 5,095,752 | 3/1992 | Suzuki et al. | 73/517 R |
| 5,103,279 | 4/1992 | Gutteridge | 357/25 |
| 5,205,171 | 4/1993 | O'Brien et al. | 73/517 B |
| 5,345,824 | 9/1994 | Sherman et al. | 73/517 B |
| 5,417,312 | 5/1995 | Tsuchitani et al. | 188/181 A |
| 5,456,111 | 10/1995 | Hulsing | 73/514.32 |
| 5,540,095 | 7/1996 | Sherman et al. | 73/514.18 |
| 5,587,343 | * 12/1996 | Kano et al. | 437/228 |
| 5,619,050 | * 4/1997 | Uenoyama et al. | 257/254 |
| 5,818,093 | * 10/1998 | Gutteridge et al. | 257/417 |
| 5,874,675 | * 2/1999 | Emans et al. | 73/514.21 |

OTHER PUBLICATIONS

Harvey C. Nathanson, William E. Newell, Robert A Wickstrom, & John R. Davis, Jr., "The Resonant Gate Transistor", IEEE Transactions on Electron Devices, Mar. 1967, pp. 117–133, vol. Ed–14, No. 3.

M.J. Usher, I.W. Buckner, & R.F. Burch, "A Miniature Wideband horizontal–component feedback seismometer", Journal of Physics E: Scientific Instruments, 1977, pp. 1253–1260, vol. 10, Great Britian.

Kevin E. Burcham, Gregory N. DeBrabander, & Joseph T. Boyd, "Micromachined Silicon Cantilever Beam Accelerometer Incorporating an Integrated Optical Waveguide", Pro. of Integrated Optics and Microstructures 1992, pp. 12–18, SPIE vol. 1793.

Takashi Yoshida, Takahiro Kudo, Satoshi Kato, Shun–Ichi Miyazaki, Shinjiro Kiyono & Kyoichi Ikeda, "Strain Sensitive Resonant Gate Transistor", IEEE Proceedings of MEMS95, Amsterdam, 1995, pp. 316–321.

(List continued on next page.)

Primary Examiner—Hezron Williams
Assistant Examiner—Rose M. Miller
(74) Attorney, Agent, or Firm—Jay R. Yablon

(57) ABSTRACT

This invention relates to an apparatus for making highly sensitive differential measurements of acceleration. The vibration sensor includes the use of moveable gate field effect transistors to sense the motion of a cantilever beam relative to the motion sensed by a reference structure, it also includes an actuator element formed by a pair of electrodes actuating electrostatically on the beam. A feedback control loop is also included for force balance operation resulting in a very wide dynamic range for the sensor.

28 Claims, 7 Drawing Sheets

OTHER PUBLICATIONS

Shun–Ichi Miyazaki, Takashi Yoshida, & Kyoichi Ikeda, "Strain Sensitive Resonant Gate Transistor", Proceedings of Micromachined Devices and Components II, SPIE vol. 2882, 1996, pp. 278–285.

Adolfo Gutierrez, Daniel Edmans, Chris Cormeau, Gernot Seidler, Dave DeAngelis, & Edward Maby, "Si Micromachined Sensor for Broadband Vibration Analysis", Pro of Int'l Conf. on Int. Micro/Nanotechnology for Space App., 1995, Houston, TX.

E.W. Maby, C.M. Cormeau, D.M. Edmans, & J.G. Fiorenza, "Micro–microphones for Insect Detection", Proceedings of the Second Symposium on Agroacoustics, National Center for Physical Acoustics, University of Mississippi, May 1996, pp. 1–8.

E.W. Maby, C.M. Cormeau, D.M. Edmans, & J.G. Fiorenza, "Micro–microphones for Insect Detection", Abstracts, Second Symposium on Agroacoustics, National Center for Physical Acoustics, University of Mississippi, Sep. 1995.

* cited by examiner

DIFFERENTIAL WIDEBAND VIBRATION

CROSS-REFERENCE TO RELATED APPLICATIONS

This application is a continuation-in-part of application Ser. No. 08/821,042, filed Mar. 20, 1997, now U.S. Pat. No. 5,874,675, issued Feb. 23, 1999.

FIELD OF THE INVENTION

This invention relates to the field of accelerometers, and particularly to enhancing the high frequency capabilities of accelerometers, and to differential measurement capabilities of accelerometers.

BACKGROUND OF THE INVENTION

The concept of a moveable gate Field Effect Transistor (FET) has been extensively studied and reported in literature. A number of devices have been disclosed that make use of a moveable gate FET for building accelerometers.

Force balance feedback control of vibration sensors has been used in seismometers and in accelerometers for attaining increased bandwidth and dynamic range. A number of devices using this approach have been routinely demonstrated and its theory of operation is well understood. Several seismometer and accelerometer manufacturers base their designs on this principle.

The fabrication of a silicon accelerometer using wafer bonding techniques is disclosed in great detail in U.S. Pat. No. 5,095,752 and No. 5,417,312. In these invention disclosures a relatively large mass made of silicon is encapsulated in a cavity formed by electrodes made out of glass on silicon. The accelerometer is operated using an active feedback loop, in which control voltages are applied to the upper and lower electrodes. The displacement of the free mass under acceleration requires compensation through changes in the voltage applied between the upper and lower electrodes and the moving mass.

Utilizing the FET concept, the feedback bulk silicon micromachined accelerometer disclosed in U.S. Pat. No. 5,205,171 makes use of a feedback loop and at least one pair of dual electrodes acting as capacitive transducers. Differential sensing of the beam-gate capacitance variations is used to generate a null feedback signal used to modulate the voltage applied to electrodes in order to prevent them from moving. Based on the similar concept of using a FET, a device with acceleration dependent gain is disclosed in U.S. Pat. No. 5,103,279 and a device that uses a piezoelectric device to generate voltage for the gate is disclosed in U.S. Pat. No. 4,873,871.

The type of accelerometers mentioned above have good sensitivity at low frequencies but limited sensitivity at high frequencies, although they result in higher bandwidth devices than open loop devices. In addition, due to mechanical and electronic manufacturing variations from one accelerometer to the next, the process of calibrating any given accelerometer to detect vibration as differentiated against a "zero" vibration level is difficult without means to establish such a differential reading.

One fundamental problem of implementing a vibration sensor is that most of the time the fabrication process used to implement the sensor is incompatible with the most common processes used to implement the standard electronics associated with the sensor. To solve this incompatibility, it is often preferred to fabricate the sensor in a separate die from the electronic circuitry. This type of multi-die implementation, however, results in higher costs and lower yield since a more complex multi-die packaging is needed. In some cases cost considerations might advise the use of a monolithic (single-dye) implementation in which the sensor and accompanying electronics reside in the same die.

OBJECTS OF THE INVENTION

It is an object of the invention disclosed herein to provide an accelerometer featuring a force balanced feedback loop in which the electrodes are used as actuating elements in the control loop and the sensing element utilizes a FET having a moveable gate. Variations in the geometric configuration of the gate can also be used to increase capacitance and hence sensitivity. This approach enables increased sensitivity and greater maximum signal range resulting in an increased bandwidth and dynamic range typical of a force balance system. Furthermore, the disclosed accelerometer is compatible with microelectromechanical systems processing.

It is also an object of the invention to provide said accelerometer with an associated mechanical and electrical reference to allow true calibration of vibration measurements.

It is also an object of the invention to provide a means of overcoming the usual incompatibilities between sensor fabrication and an electronic device fabrication processes.

SUMMARY OF THE INVENTION

The present invention provides a high sensitivity wideband MEMS (Microelectromechanical Systems) acceleration sensor of the force balanced type based on the use of a closed feedback loop for attaining maximum bandwidth for the sensed variables. The vibration sensor operates through the action of forces applied electrostatically between a pair of fixed electrodes and the suspended mass configured to form a closed feedback loop. The most useful form of control is negative feedback which is intended to keep the mass in a nearly fixed position with respect to the electrodes and substrate, making the suspension appear more stiff and increasing the natural frequency.

The operation of the wideband vibration sensor is based on a feedback loop which includes a moveable gate FET otherwise known as a MGT (Moveable Gate Transistor) as the sensor element. The MGT offers the best means for detecting out-of-plane oscillations in a very small area, since it relies on capacitance per unit area (as opposed to total capacitance).

An important embodiment of the invention includes an associated mechanical and electrical reference structure to allow for differential measurements with the accelerometer. The use of a reference allows calibration of the sensor to an electronic and mechanical "zero" of vibration. This simplified measurement approach eliminates costly precision tuning of individual units and allows for cost effective, automated self-calibration during operation.

BRIEF DESCRIPTION OF THE DRAWING

The features of the invention believed to be novel are set forth in the appended claims. The invention, however, together with further objects and advantages thereof, may be best understood by references to the following description taken in conjunction with the accompanying drawing in which:

DETAILED DESCRIPTION OF INVENTION

Figure 1:
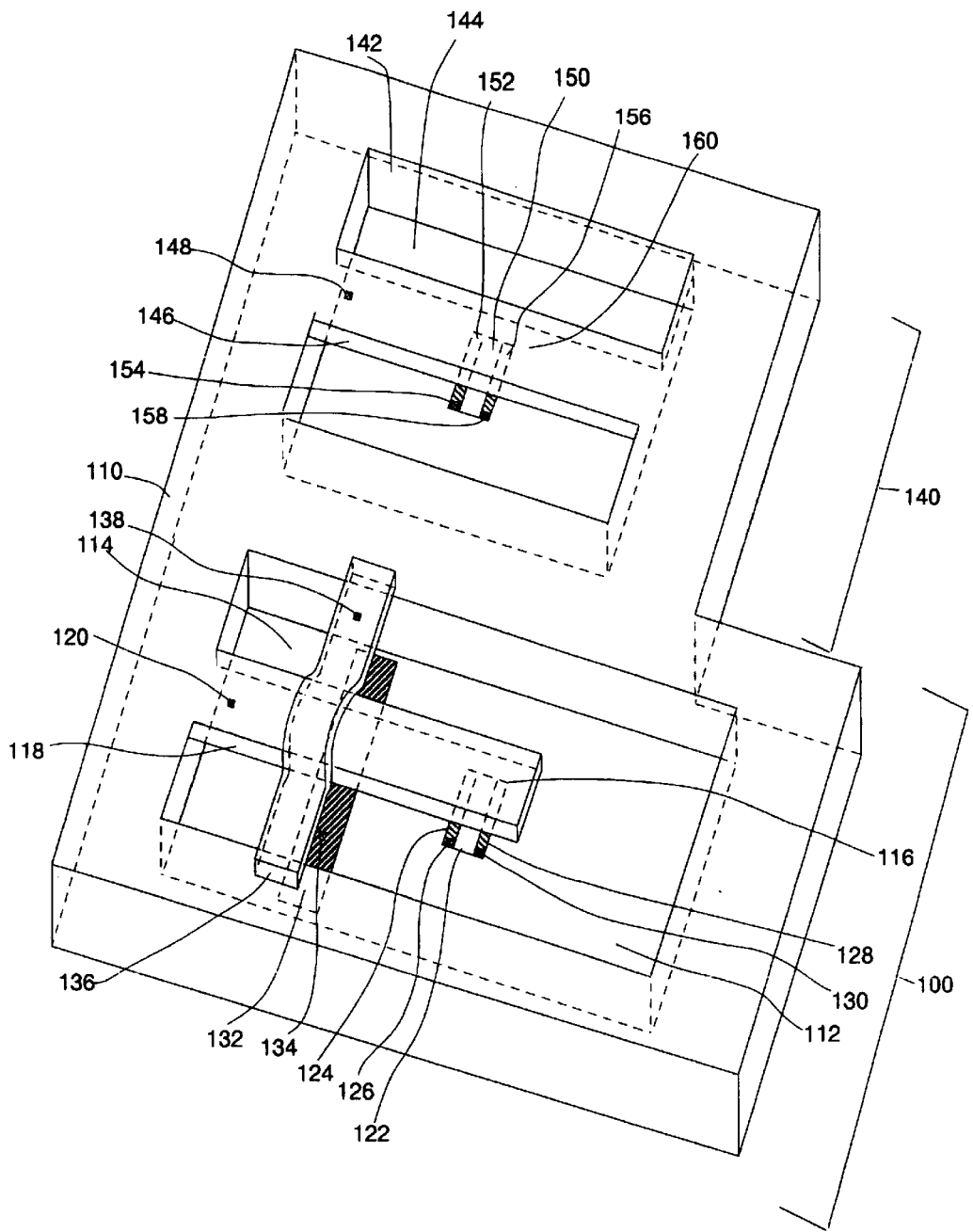
FIG. 1 is an isometric view of the preferred embodiment of the wideband vibration sensor invention. The figure shows the primary components of the sensor, the electrode pair (upper and lower feedback electrodes), the MGT, and the reference structure.

A preferred embodiment of the present invention is depicted in FIG. 1. Referring to FIG. 1, vibration sensor 100 comprises a base 110 with a cavity 112 and a cavity floor 114 in a central region of base 110. A moveable suspended mass 118 such as the illustrated cantilever beam, thinner than the depth of the cavity, projects horizontally from a top surface of one end of base 110, partially extending over central cavity 112. An electrically-conductive suspended mass (cantilever beam) contact pad 120 is positioned on the top surface of moveable suspended mass 118. A gate region 116, is defined as the free end of moveable suspended mass 118 immediately above a channel 122, i.e., as that region of moveable suspended mass 118 that is sufficiently proximate to said channel 122 so as to electromagnetically interact with said channel 122 in a substantial manner. An external power means is connected to cantilever beam contact pad 120 in order to deliver specified voltages to gate region 116 of moveable suspended mass 118, as subsequently described.

On cavity floor 114, beneath gate region 116 of moveable suspended mass 118, is channel 122. Extending from one side of channel 122, substantially perpendicular to the direction of moveable suspended mass 118, is a source implant 124. An electrically-conductive source implant contact pad 126 is located on source implant 124. Extending from the substantially opposite side of channel 122, is a drain implant 128. An electrically-conductive drain implant contact pad 130 is located on drain implant 128. An external power means is connected to source implant contact pad 126 to supply current to source implant 124. Similarly, a means of sensing current flow is connected to drain implant contact pad 130 in order to sense the modulated current flow output from drain implant 128.

A lower feedback electrode 132 is superficially buried in cavity floor 114 beneath moveable suspended mass, e.g., cantilever beam 118. In the preferred embodiment of the invention, lower feedback electrode 132 is positioned generally perpendicular to and beneath a central region of moveable suspended mass 118, as shown in FIG. 1. Positioned on lower feedback electrode 132 is a lower feedback electrode contact pad 134, which is used to supply a feedback voltage to lower feedback electrode 132, as subsequently described.

Similarly, an upper feedback electrode 136 is positioned above the central region of moveable suspended mass 118. Upper feedback electrode 136 is preferably positioned directly above and parallel to lower feedback electrode 132. In the preferred embodiment of the invention, upper feedback electrode 136, similarly to lower feedback electrode 132, is substantially perpendicular to and above the central region of moveable suspended mass 118. Upper feedback electrode 136 bridges across the width of cavity 112, and is secured to base 110. Positioned on upper feedback electrode 136, is an upper feedback electrode contact pad 138, which is used to supply a feedback voltage to upper feedback electrode 136, as subsequently described.

A reference structure 140 is positioned substantially adjacent to and in close proximity to vibration sensor 100. The purpose of reference structure 140 is to provide a means of achieving differential measurements that eliminate the need for precise process control and costly post-fabrication calibration of individual units. It allows for measurement of the static equilibrium current flow inherent in the sensor, by providing a current flow from a static suspended reference mass 146 that represents "zero" vibration. This is then subtracted from current flows detected through moveable suspended mass 118 to obtain a true calibration of readings from moveable suspended mass 118.

Reference structure 140 is supported by base 110 and includes a secondary cavity 142 and a secondary cavity floor 144. Static suspended reference mass 146 is doubly anchored on each end as shown, and is substantially similar in width and thickness to moveable suspended mass 118. Static suspended reference mass 146 is suspended across secondary cavity 142 above secondary cavity floor 144, at substantially the same height above secondary cavity floor 144 as moveable suspended mass 118 is above cavity floor 114. Static suspended reference mass 146 is supported on both ends by base 110. An electrically conductive reference mass contact pad 148 is positioned on the top surface of static suspended reference mass 146.

On secondary cavity floor 144, beneath reference gate region 160 of static suspended reference mass 146, is a reference channel 150. Extending from one side of reference channel 150, substantially perpendicular to the direction of static suspended reference mass 146, is a reference source implant 152. An electrically-conductive reference source implant contact pad 154 is located on reference source implant 152. Extending from the substantially opposite side of reference channel 150, is a reference drain implant 156. An electrically-conductive reference drain implant contact pad 158 is located on reference drain implant 156. External power means are connected to reference source implant contact pad 154 in order to supply current to reference source implant 152. Similarly, current flow sensing means are connected to reference drain implant contact pad 158 to sense the equilibrium current flow output from reference drain implant 156. To be able to obtain measurements of a comparable nature, reference channel 150, reference source implant 152, and reference drain implant 156 are of substantially the same size and geometric configuration as channel 122, source implant 124, and drain implant 128.

Figure 2:
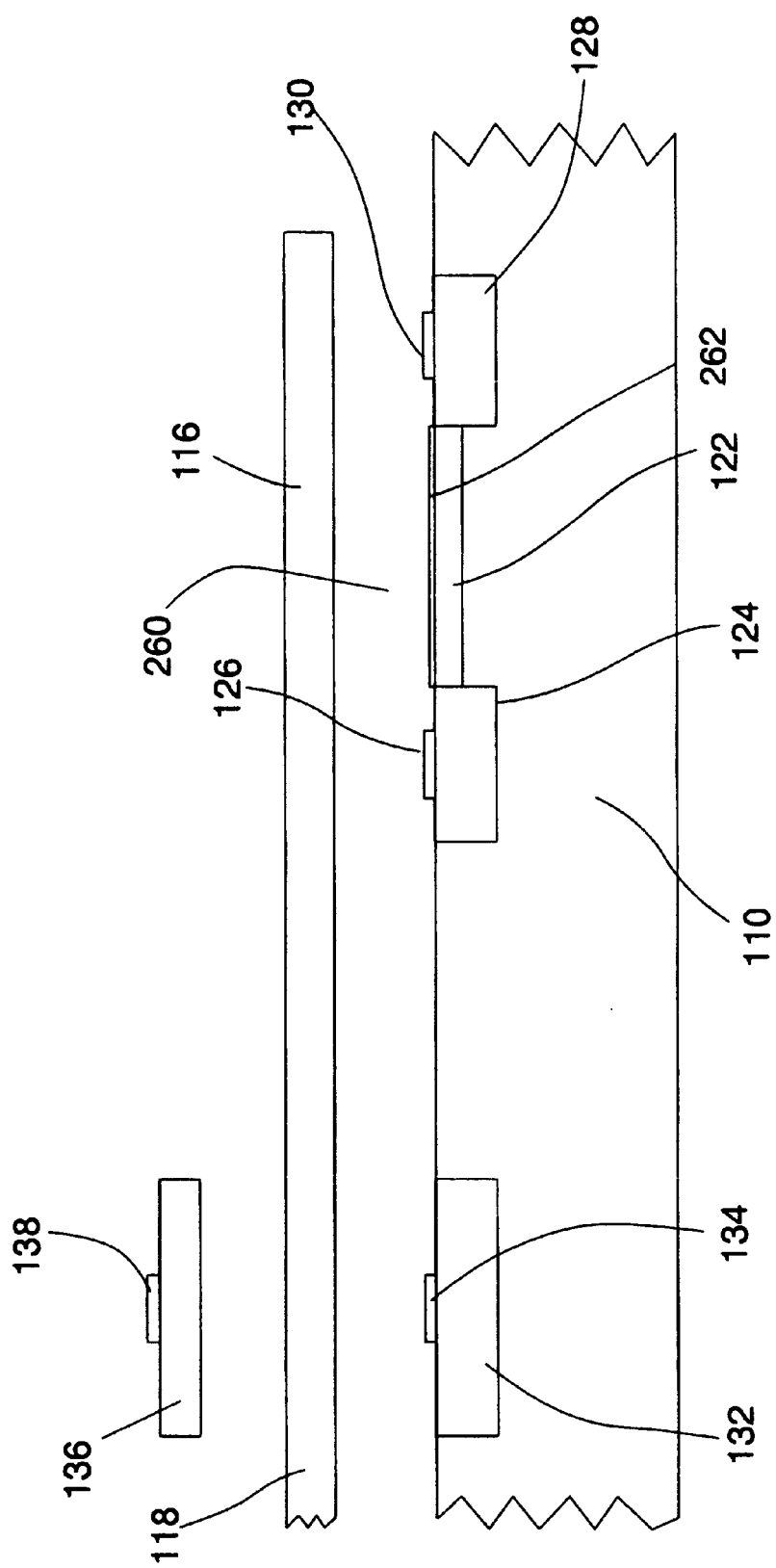
FIG. 2 is a cross-sectional side view detailing the area of the MGT and the electrode pair.

Referring to FIG. 2, the functional aspects of sensor 100 are described as follows. An airgap 260 is defined as the clearance between gate region 116 and channel 122. As a voltage is applied to gate region 116 of moveable suspended mass 118 via cantilever beam contact pad 120, charge accumulates in channel 122 between source implant 124 and drain implant 128. At the operating bias voltage, inversion occurs in channel 122, and current flows between source implant 124 and drain implant 128. The operating bias voltage applied to both vibration sensor 100 and reference structure 140 are equal at all times, so that measurements taken from each can be appropriately compared.

The bias voltage applied to gate region 116 (via pad 120), source implant 124 (via pad 126), and drain implant 128 (via pad 130) are adjustable and are set to values that enable a good signal to noise ratio. The vibration of moveable suspended mass 118 modulates the current through channel 122. Therefore the measured current flow through channel 122, relative to a reference current flow through reference channel 150, corresponds to and varies with the increase and decrease in distance between channel 122 and gate region 116 of moveable suspended mass 118. When the distance is decreased such that channel 122 and gate region 116 are closer together, the current flow through channel 122 increases. When the distance is increased such that channel 122 and gate region 116 are further apart, the current flow through channel 122 decreases. Over a period of time, the source-drain current will resemble the modulation of the conductivity of channel 122, and therefore will represent the position of moveable suspended mass 118 relative to entire wideband vibration sensor 100.

Figure 3:
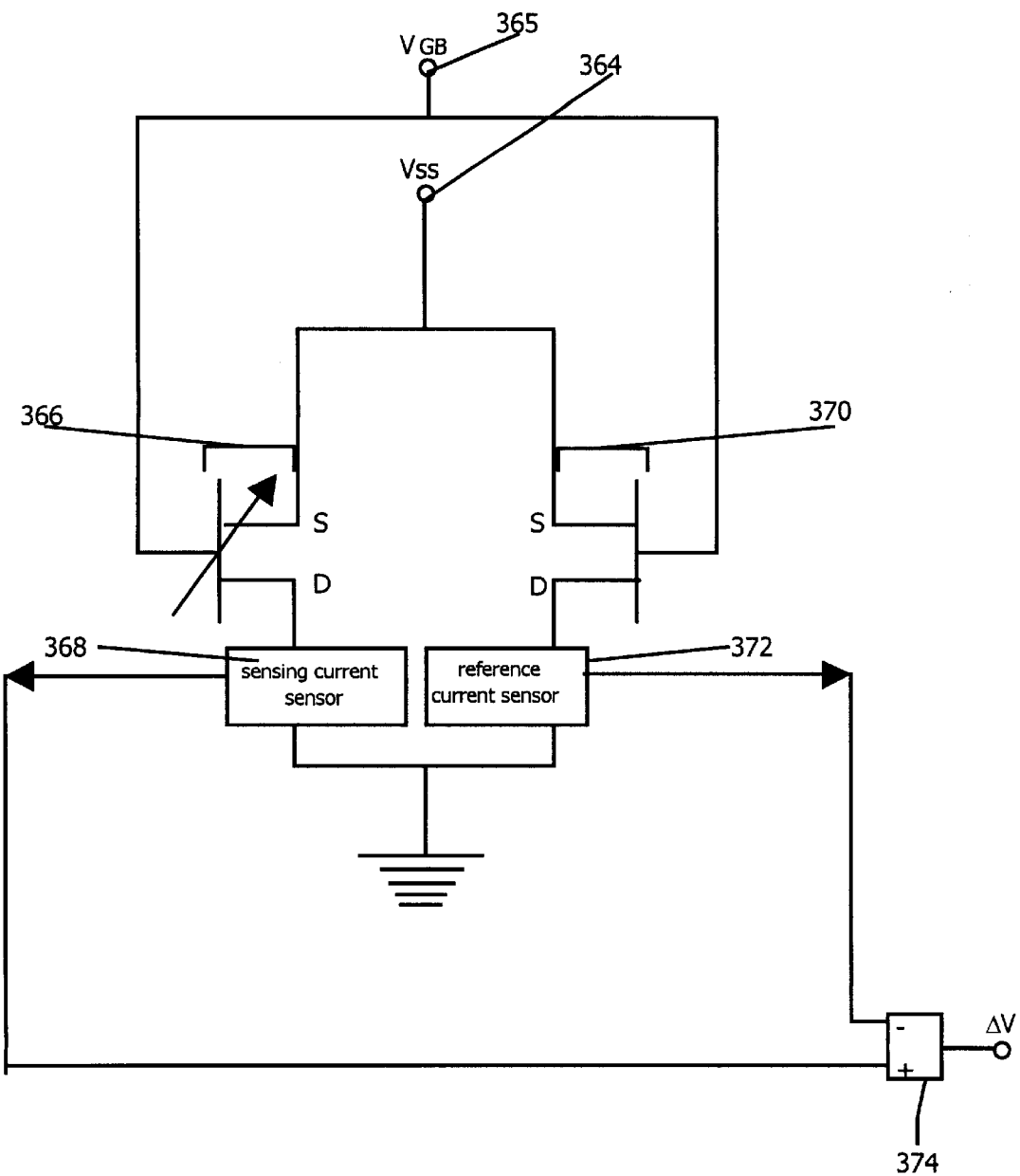
FIG. 3 is an electrical circuit diagram of the integrated moveable gate transistor and a reference transistor of the reference structure.

FIG. 3 shows the electrical circuit diagram that represents the operation, current flow and points of measurement of the present invention. An input 364 consists of the application of a steady state voltage equally to a moveable gate transistor 366 (comprising channel 122, source 124 and drain 128 of FIG. 1) and a reference transistor 370 (comprising reference channel 150, reference source 152, and reference drain 156 of FIG. 1). Similarly, a gate bias voltage 365 is equally applied to the gate regions of the circuit. Current flowing through moveable gate transistor 366 is measured at a MGT current sensing circuit 368; and current flowing through reference transistor 370 is measured at a reference current sensing circuit 372. The voltage differential is provided at an output 374. This circuit diagram provides the basic differential calibration functionality according to the invention. This diagram can easily be extended and generalized by someone of ordinary skill to include multiple moveable gate transistors, combined in series, parallel or other algorithmic combination needed to satisfy the requirements of the geometry of the sensor as seen in the alternative embodiments presented below.

A force balanced feedback control loop is then introduced that uses the positional information extracted from the source-drain current to dynamically restore the beam to its undeflected position. This mode of operation widens the dynamic range, provides a greater maximum signal range, and increases the sensitivity of the vibration sensor. A means of signal processing is located adjacent to the wideband vibration sensor with the control electronics. This feedback control loop provides a means of lossless dynamic damping to the system.

In particular, when the source-drain current is sensed to be lower than the reference value, which is indicative of an increased distance between gate region 116 and channel 122, the control loop will increase the voltage applied to lower feedback electrode contact pad 134. The voltage applied to lower feedback electrode 132 is enough to increase the electric field between moveable suspended mass 118 and lower feedback electrode 132, producing an electrostatic restoring force which overrides any acceleration in the opposite direction. Similarly, when the control loop senses and detects that the source-drain current is higher than the reference value, which is indicative of a decreased distance between gate region 116 and channel 122, the control loop will increase the voltage applied to upper feedback electrode contact pad 138. This voltage applied to upper feedback electrode 136 will increase the electric field between moveable suspended mass 118 and upper feedback electrode 136, to produce a restoring force attracting moveable suspended mass 118 towards upper electrode 136.

Referring back to FIG. 1, reference structure 140 is used to simplify the measurement process by determining the aforementioned reference current flow at equilibrium to compare to the source drain current modulation generated by vibrations of moveable suspended mass 118 about the equilibrium current. The current flow across reference channel 150, from reference source implant 152 to reference drain implant 156, is the reference current flow. This reference current flow is measured identically to the source drain current measured across channel 122. The difference in the two current measurements is related to the amount moveable suspended mass 118 is displaced from the equilibrium of static suspended reference mass 146. It is this differential measurement that provides a localized calibration to the sensor, thereby eliminating costly tuning and calibration manufacturing procedures.

The position, d, of moveable suspended mass 118 relative to the channel surface at equilibrium can be described as function, f, of the source-drain current $i_{sd}$ and the reference current $i_r$ as follows:

$$d = f(i_{sd}(t) - i_r)$$

Since $i_r$ is constant, the velocity, v, can be described as a function, g, of the derivative of the source-drain current with respect to time as follows:

$$v = g(i_{sd}(t) - i_r, di_{sd}/dt)$$

Therefore the acceleration, a, can be described as a function, h, of the second derivative of the source-drain current with respect to time squared as follows:

$$a = h(i_{sd}(t) - i_r, di_{sd}/dt, d^2i_{sd}/dt^2)$$

In the preferred embodiment, referring to FIG. 2, base 110 is made of single crystal silicon, and moveable suspended mass 118 is made of polysilicon. On top of and completely covering channel 122, is a thermally grown oxide layer 262.

In the preferred embodiment, the transducer is an n-channel field effect device, meaning channel 122 and base 110 primarily comprise p-type silicon, while source implant 124 and drain implant 128 primarily comprise n-type silicon. Alternative embodiments of the present invention include the transducer comprising a p-channel field effect device, where channel 122 and base 110 primarily comprise n-type silicon, while source implant 124 and drain implant 128 primarily comprise p-type silicon.

The preferred embodiment of the present invention can be used to obtain standard acceleration measurements. For acceleration measurements, the disclosed wideband vibration sensor is precisely mounted in a standard packaging means such as a chip carrier. The preferred embodiment of the disclosed invention assumes hybrid packaging in which the control electronics are packaged in a separate but adjacent module of similar size considerations to the sensor package.

Alternative embodiments of the present invention include variations in the position and number of both lower feedback electrode 132 and upper feedback electrode 136. When the electrodes are generally perpendicular to the direction of moveable suspended mass 118, it is possible to place them in locations above and below other areas than the central region of moveable suspended mass 118. The repositioning of the electrode pair in this manner affects the voltage required to deflect or exert the balancing force on moveable suspended mass 118. To achieve the same deflection of moveable suspended mass 118, a higher voltage is needed if the electrode pair is placed in close proximity to the base of moveable suspended mass 118, than if the electrode pair is placed closer to the free end (i.e. gate region 116) of moveable suspended mass 118.

An additional alternative embodiment of the present invention includes multiple electrode pairs distributed along the length of moveable suspended mass 118. Multiple electrode pairs distributed along the length of moveable suspended mass 118 improve the controllability of moveable suspended mass 118. Additional alternative embodiments of the present invention include aligning the sensing elements, i.e., source implant 124, drain implant 128 and channel 122, with the extended direction of moveable suspended mass 118; in other words, rotating these elements approximately 90 degrees from their position in the preferred embodiment of this invention. This rotation would allow for greater flexibility in the design of the transistor.

In the discussion to follow, when used in connection with channel 122 and reference channel 150, the term "length" refers to the distance between source 124 and drain 128 and between reference source 152 and reference drain 156, while the term "width" refers the overall span over which source 124 and drain 128, as well as reference source 152 and reference drain 156, face one another across respective channels 122 and 150. It is to be noted that as illustrated in FIG. 1, in these terms, the "lengths" of channels 122 and 150 are geometrically smaller than their "widths."

In these terms, the gain achieved by transistors generally is related to the lengths of their channels, 122 and 150 herein. A shorter channel length coupled with a larger channel width allows for increased capacitance and increased gain. In the configuration of FIG. 1, the widths of channels 122 and 150 are limited by the widths of moveable suspended mass 118 and static suspended reference mass 146. Alternative embodiment configurations can be used which present greater opportunity to maintain a small channel length while increasing channel width, to thereby increase the capacitance and gain of the transistor without sacrificing other parameters.

Figure 4:
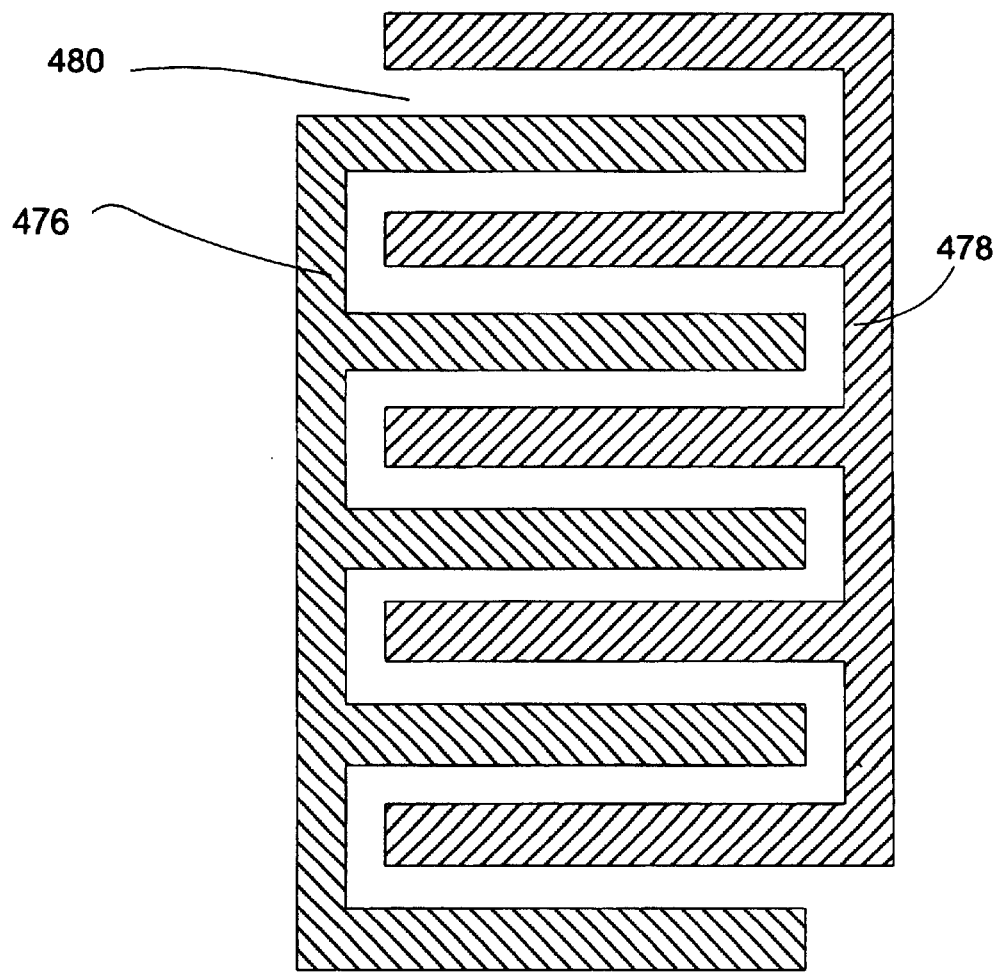
FIG. 4 is a top view of an alternative embodiment of the channel, source, and drain geometry.

One such alternative embodiment for increasing the sensitivity of the sensor by optimizing the ratio of the channel width to the channel length and by increasing the capacitance by ensuring the gate is close to and completely covering the channel region is illustrated in FIG. 4. FIG. 4 shows an alternative channel, source, and drain configuration that can be implemented to increase the sensitivity of the sensor by increasing the channel width while the channel length remains optimally small. An alternative source implant 476 is configured with multiple fingerlike extensions that interdigitate with an alternative drain implant 478 with similar fingerlike extensions. An alternative channel 480 runs between alternative source 476 and alternative drain 478.

Figure 5:
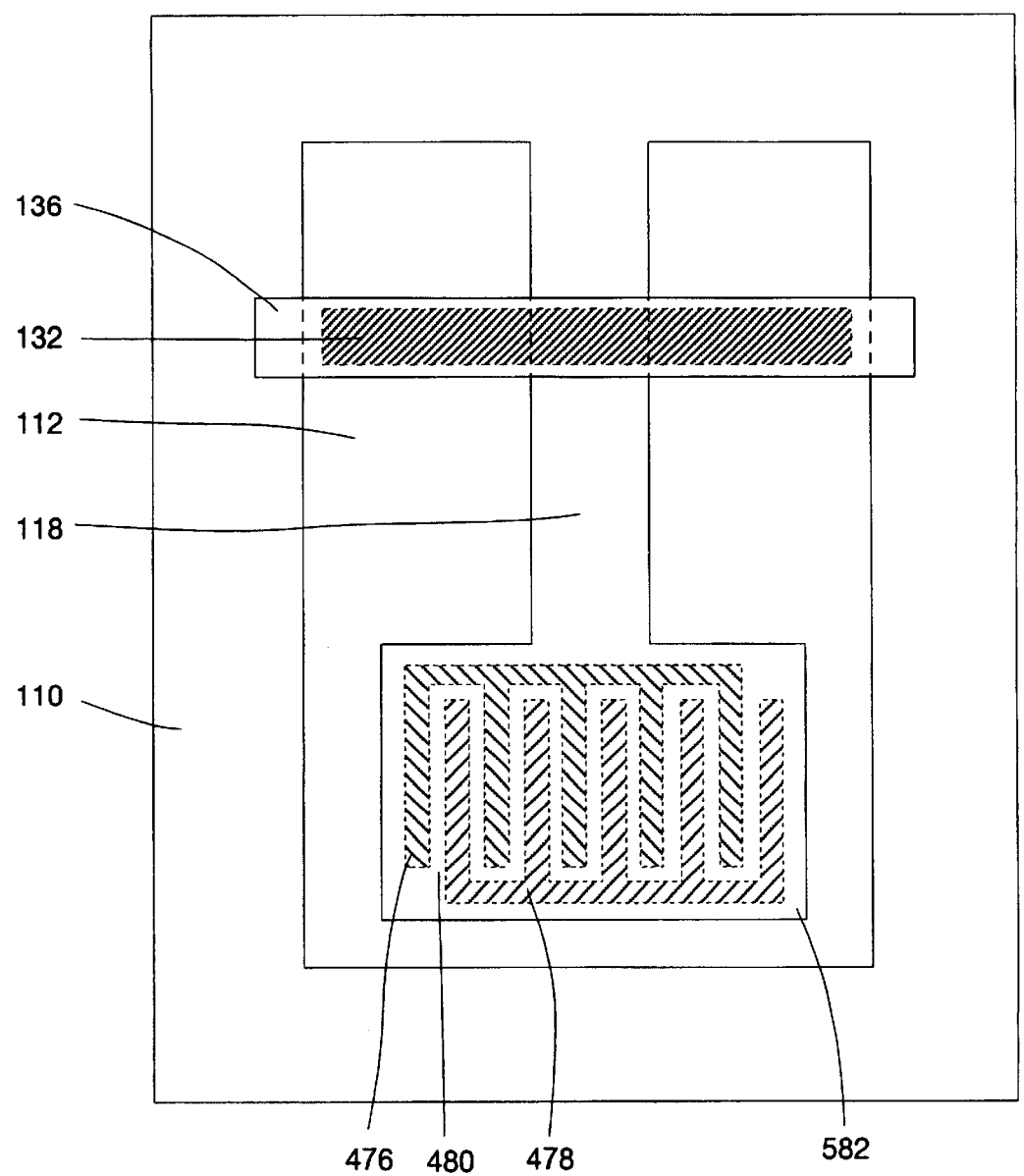
FIG. 5 is a top view of an alternative embodiment of the invention incorporating the channel, source, and drain geometry of FIG. 4.

FIG. 5 shows the implementation of this alternative channel, source, and drain geometry with an associated alternative gate geometry. As described in the preferred embodiment, moveable suspended mass 118 is supported by base 110 over cavity 112. Upper electrode 136 and lower electrode 132 are also similarly positioned. In FIG. 5, a widened alternative gate region 582 is positioned over alternative source 476, alternative drain 478, and alternative channel 480. The operation is the same but the sensitivity is significantly enhanced due to the increased channel width while the channel length remains optimally small, which increases the forward transconductance of the sensor.

To maintain comparable measurements, if an alternative transistor and gate configuration such as that shown in FIGS. 4 and 5 is used in connection with moveable suspended mass 118 (and vibration sensor 100 generally), a similar alternative transistor configuration should also be used in connection with static suspended reference mass 146 (and reference structure 140 generally). It is understood that FIG. 4 illustrates one particular approach to providing a higher-gain transistor for use in accordance with the invention, but that any other high-gain transistor configuration that may be known or apparent to someone of ordinary skill, when used in accordance with the invention, is considered to be within the scope of this disclosure and its associated claims. In this and related embodiments, a particular selection of moveable suspended mass 118 and static suspended reference mass 146 is accompanied by a suitably-compatible gate region 116 and reference gate region 160, such as the widened alternative gate region 582 to accompany alternative source 476, alternative drain 478, and alternative channel 480.

Yet another alternative embodiment of the present invention is a configuration for direct capacitance sensing measurements instead of the current capacitance measurements heretofore described. In order to accomplish this the capacitance in the gate area must be significantly increased. This can be achieved using one or both of the following approaches. First, the cantilever beam, or more generally moveable suspended mass 118, can be made significantly wider. Second, one may use a plurality of cantilever beams, or more generally moveable suspended masses 118, substantially in parallel with one another.

Figure 6:
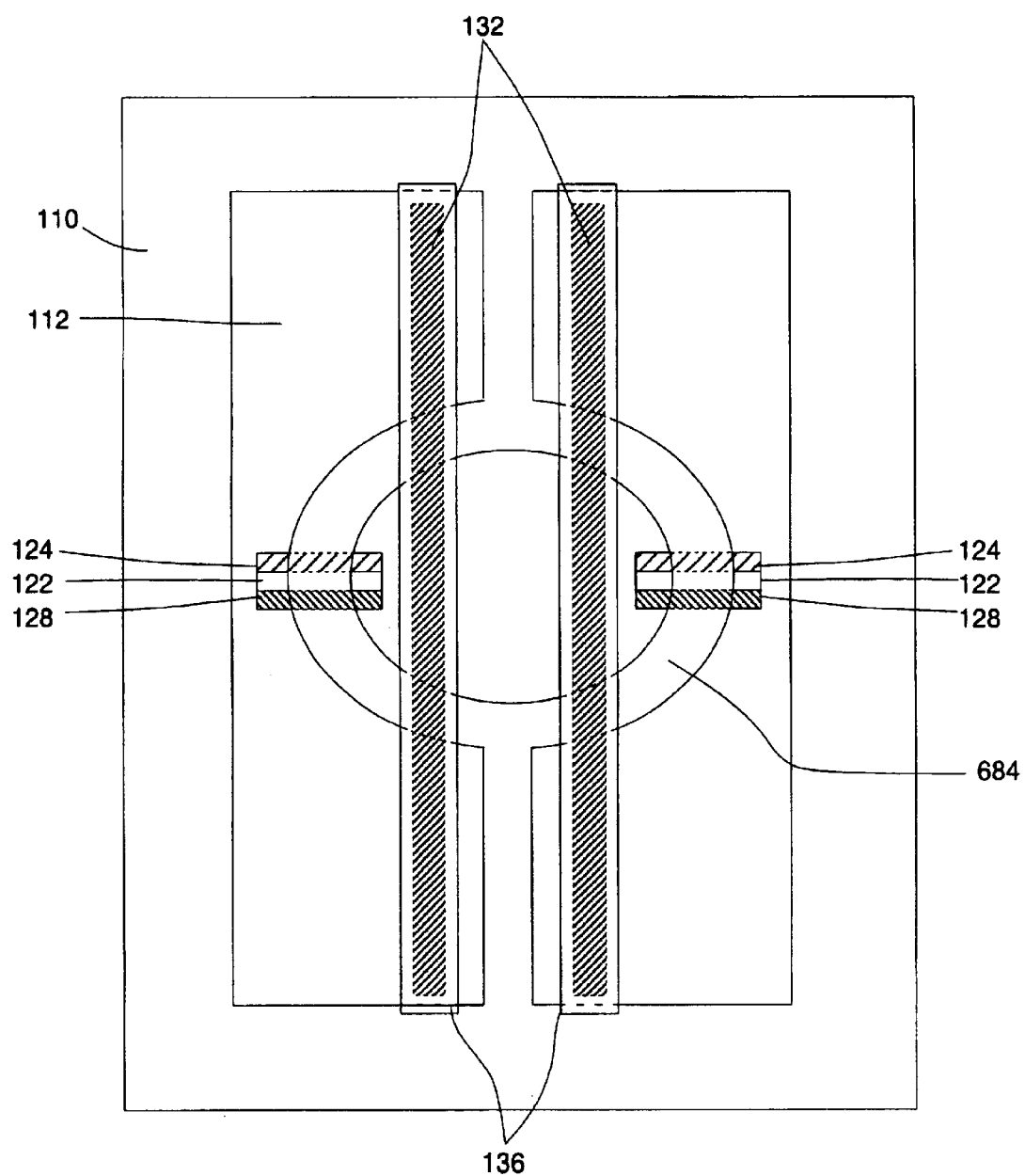
FIG. 6 is a top view of an alternative configuration of the gate geometry, specified as a coil.
Figure 7:
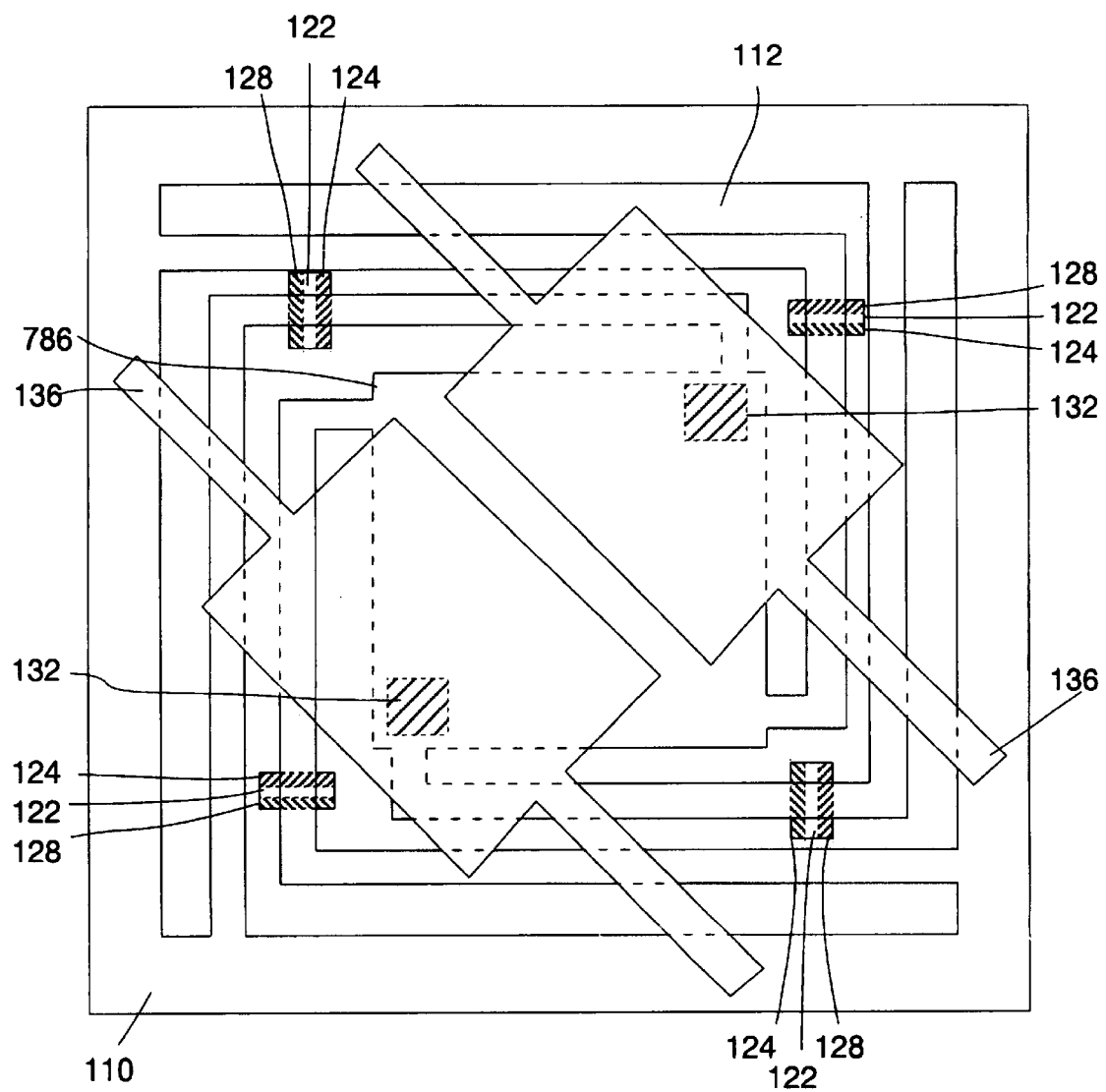
FIG. 7 is a top view of an alternative configuration of the gate geometry, specified as a diaphragm.

Another alternative embodiment of the present invention uses alternative geometries of moveable suspended mass 118 aside from a cantilever beam. Exemplary alternative geometries include coils and diaphragms. FIGS. 6 and 7 show a top view of these alternative suspended masses, and thus corresponding alternative gate geometries, respectively. In these alternative geometries, it is understood that the geometry of the movable suspended mass 118 is directly related to the vibratory motion to be detected, the configuration of the transistors, the current flow determination algorithms, and the configuration of the electrodes. More complex geometries require more anchors to base 110 than the cantilever beam described above, but in no way indicate a static reference such as static suspended reference mass 146. Similarly, complex geometries require multiple transistors to determine vibratory motion and are combined in unique algorithms specific to the geometries to arrive at a total source-drain current to be compared to a reference.

FIG. 6 shows an alternative embodiment in which the suspended mass is a coil. This geometry is beneficial in applications where complex vibrations are to be measured since the device is bistable. As shown in FIG. 6, base 110 supports a coil suspended mass 684 over cavity 112. Source implants 124, drain implants 128, and channels 122 are optimally placed under coil suspended mass 684. Similarly, lower electrodes 132 and upper electrodes 136 are positioned to provide feedback control. Coil suspended mass 684 is doubly anchored, similarly to static suspended reference mass 146. However, unlike with static suspended reference mass 146, the geometry of this configuration lends to a rocking motion of coil 684 when subjected to vibrations. Multiple transistors are used to decipher the resulting complex motion according to a more generalized application of FIG. 3 to multiple transistors.

FIG. 7 shows an alternative embodiment in which the suspended mass is a diaphragm, or more specifically, a torsional diaphragm. This geometry would be beneficial in an application in which low frequency vibrations are to be measured, since the footprint of the sensor can be relatively large. As shown in FIG. 7, base 110 supports a diaphragm suspended mass 786 over cavity 112. Source implants 124, drain implants 128, and channels 122 are optimally placed under diaphragm suspended mass 786, for example, as shown. Similarly, lower electrodes 132 and upper electrodes 136 are positioned to provide feedback control, for example, as shown. Note from this embodiment, that upper 136 and lower 132 feedback electrodes do not necessary need to be elongated members substantially parallel and coextensive with one another. Any configuration suitable for applying appropriate negative feedback control is acceptable according to the invention. Similarly to FIG. 6, this also uses multiple transistors, and the current flowing through each of the several channels 122 are be combined using a suitable algorithm to arrive at a total source drain current to be compared to the reference current, again generalizing FIG. 3 to multiple transistors.

Yet another alternative embodiment of the present invention can be realized referring back to FIG. 1. If reference structure 140 is implemented independently of vibration sensor 100, it can serve as a generic transistor for electronic circuitry that solves the fabrication incompatibility problem described in the background. More specifically, reference structure 140 comprises the basic elements of a generic transistor such as reference gate 160, reference channel 150, reference source 152 and reference drain 156. Implemented independently, reference structure 140 can serve as a generic transistor in a variety of electronic circuits and provide a means of overcoming the usual incompatibilities between sensor fabrication processes and electronic device fabrication process.

While only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

We claim:

1. A differential vibration sensor, comprising:
   a moveable suspended mass;
   at least one moveable gate transistor proximate said moveable suspended mass;
   a static suspended reference mass; and
   a reference transistor proximate said static suspended reference mass; wherein:
   a modulated sensing current flow of said at least one moveable gate transistor is compared with a reference current flow of said reference transistor to deduce the kinetics and hence the vibrations of said moveable suspended mass with respect to a mechanical equilibrium state.

2. The sensor of claim 1, further comprising:
   a control module; wherein
   based on the sensing of said sensing current flow and said comparison to said reference current flow, said control module controls the imposition of an opposing displacement force on said moveable suspended mass by applying negative feedback control.

3. The sensor of claim 2, further comprising at least one pair of feedback electrodes comprising an upper feedback electrode above and a lower feedback electrode below said moveable suspended mass; wherein said opposing displacement force is imposed on said moveable suspended mass by:
   applying a voltage to the lower feedback control electrode to attract said moveable suspended mass toward a sensing channel of said at least one moveable gate transistor, when said sensing current flow indicates a position of increased distance between said moveable suspended mass and said sensing channel; and
   applying a voltage to the upper feedback control electrode to attract said moveable suspended mass away from said sensing channel, when said sensing current flow indicates a position of decreased distance between said moveable suspended mass and said sensing channel.

4. The sensor of claim 1:
   said moveable suspended mass further comprising a sensing gate region proximate an area of large displacement amplitude of said moveable suspended mass;
   each said at least one moveable gate transistor further comprising a sensing channel thereof;
   said static suspended reference mass further comprising a reference gate region thereof; and
   said reference transistor further comprising a reference channel thereof; wherein:
   vibrations to be detected alter a kinetic relationship between said sensing gate region and said sensing channel;
   the alteration of said kinetic relationship modulates said sensing current flow through said at least one moveable gate transistor;
   said sensing current flow is sensed;
   said reference current flow, representative of a mechanical equilibrium state between said static suspended reference mass and said reference transistor, is sensed;
   said sensing current flow is compared to said reference current flow to deduce said kinetics and hence said vibrations of said moveable suspended mass with respect to said mechanical equilibrium state.

5. The sensor of claim 4, further comprising:
   a control module; wherein
   based on the sensing of said sensing current flow and said comparison to said reference current flow, said control module controls the imposition of an opposing displacement force on said moveable suspended mass by applying negative feedback control.

6. The sensor of claim 5, further comprising at least one pair of feedback electrodes comprising an upper feedback electrode above and a lower feedback electrode below said moveable suspended mass; wherein said opposing displacement force is imposed on said moveable suspended mass by:
   applying a voltage to the lower feedback control electrode to attract said moveable suspended mass toward said sensing channel, when said sensing current flow indicates a position of increased distance between said moveable suspended mass and said sensing channel; and
   applying a voltage to the upper feedback control electrode to attract said moveable suspended mass away from said sensing channel, when said sensing current flow indicates a position of decreased distance between said moveable suspended mass and said sensing channel.

7. The sensor of claim 4, each said at least one moveable gate transistor further comprising a sensing source and a sensing drain; and
   said reference transistor further comprising a reference source and a reference drain; wherein:
   a bias voltage is applied between said sensing source and said sensing drain;
   said sensing current flow is generated from said sensing drain, by applying said bias voltage to said sensing gate region such that vibratory perturbations of said sensing gate region toward and away from said sensing channel, cause said sensing current flow to modulate high and low, respectively;

said bias voltage is further applied between said reference source and said reference drain; and said reference current flow is generated from said reference drain, by applying the bias voltage to said reference gate region such that the static character of said static suspended reference mass causes said reference current flow to remain substantially constant.

8. The sensor of claim 4, wherein said moveable suspended mass is selected from the suspended mass group consisting of: a cantilever beam, a coil and a diaphragm.

9. The sensor of claim 4, wherein the position d of said sensing gate region of said moveable suspended mass, relative to an unperturbed position of said sensing gate region, is deduced as a function, f, of said sensing current flow $i_{sd}$ and said reference current flow $i_r$, at time t, by the relationship $d=f(i_{sd}(t)-i_r)$.

10. The sensor of claim 4, wherein the velocity v of said sensing gate region of said moveable suspended mass relative to an unperturbed velocity of said sensing gate region, is deduced as a function, g, of said sensing current flow $i_{sd}$, and said reference current flow $i_r$, with respect to time t, by the relationship $v=g(i_{sd}(t)-i_r, di_{sd}/dt)$.

11. The sensor of claim 4, wherein the acceleration a of said sensing gate region of said moveable suspended mass relative to an unperturbed acceleration of said sensing gate region, is deduced as a function, h, of said sensing current flow $i_{sd}$, and said reference current flow $i_r$, with respect to time t, by the relationship $a=h(i_{sd}(t)-i_r, di_{sd}/dt, d^2i_{sd}/dt^2)$.

12. The sensor of claim 4, wherein said sensor is embodied in an integrated microchip unit.

13. The sensor of claim 4, wherein lengths and widths of said sensing channel and said reference channel are configured to optimize the capacitance and gain of said at least one moveable gate transistor and said reference transistor; and wherein said moveable suspended mass and said static suspended reference mass comprise sensing gate regions and reference gate regions configured to be compatible with said optimized transistors.

14. The sensor of claim 13, wherein said optimized transistors further comprise:

source implants configured with a plurality of fingerlike extensions; and drain implants configured with a similar plurality of fingerlike extensions interdigitating with the fingers of said source implants; and said channels running between said source implants and said drain implants.

15. A method for sensing vibrations, including deducing the kinetics and hence the vibrations of a moveable suspended mass with respect to a mechanical equilibrium state, comprising the step of:

comparing a modulated sensing current flow of at least one moveable gate transistor proximate said moveable suspended mass with a reference current flow of a reference transistor proximate a static suspended reference mass.

16. The method of claim 15, further comprising the step of:

based on sensing said sensing current flow and comparing said sensing current flow to said reference current flow, using a control module to control the imposition of an opposing displacement force on said moveable suspended mass by applying negative feedback control.

17. The method of claim 16, further comprising the steps of imposing said opposing displacement force on said moveable suspended mass by:

applying a voltage to a lower feedback electrode of at least one electrode pair, thereby attracting said moveable suspended mass toward a sensing channel of said at least one moveable gate transistor, when said sensing current flow indicates a position of increased distance between said moveable suspended mass and said sensing channel; and applying a voltage to an upper feedback electrode of said at least one electrode pair to attract said moveable suspended mass away from said sensing channel, when said sensing current flow indicates a position of decreased distance between said moveable suspended mass and said sensing channel.

18. The method of claim 15, comprising the further steps of:

using said vibrations to alter a kinetic relationship between a sensing gate region proximate an area of large displacement amplitude of said moveable suspended mass and sensing channels of said at least one moveable gate transistor;

modulating said sensing current flow based upon the alteration of said kinetic relationship;

sensing said sensing current flow;

sensing said reference current flow, representative of said mechanical equilibrium state, between said static suspended reference mass further comprising a reference gate region thereof and said reference transistor comprising a reference channel thereof; and deducing said kinetics and hence said vibrations of said moveable suspended mass with respect to said mechanical equilibrium state by comparing said sensing current flow to said reference current flow.

19. The method of claim 18, further comprising the step of:

based on sensing said sensing current flow and comparing said sensing current flow to said reference current flow, using a control module to control the imposition of an opposing displacement force on said moveable suspended mass by applying negative feedback control.

20. The method of claim 19, further comprising the steps of imposing said opposing displacement force on said moveable suspended mass by:

applying a voltage to a lower feedback electrode of at least one electrode pair, thereby attracting said moveable suspended mass toward said sensing channel, when said sensing current flow indicates a position of increased distance between said moveable suspended mass and said sensing channel; and applying a voltage to an upper feedback electrode of said at least one electrode pair to attract said moveable suspended mass away from said sensing channel, when said sensing current flow indicates a position of decreased distance between said moveable suspended mass and said sensing channel.

21. The method of claim 18, further comprising the steps of:

applying a bias voltage between sensing sources and sensing drains of each said at least one moveable gate transistor;

further applying said bias voltage between a reference source and a reference drain of said reference transistor;

generating said sensing current flow from said sensing drain, by applying said bias voltage to said sensing gate region such that vibratory perturbations of said sensing gate region toward and away from said sensing channel, cause said sensing current flow to modulate high and low, respectively; and generating said reference current flow from said reference drain, by applying the bias voltage to said reference gate region such that the static character of said static suspended reference mass causes said reference current flow to remain substantially constant.

22. The method of claim 18, wherein said moveable suspended mass is selected from the suspended mass group consisting of: a cantilever beam, a coil, and a diaphragm.

23. The method of claim 18, further comprising the step of deducing the position d of said sensing gate region of said moveable suspended mass, relative to an unperturbed position of said sensing gate region, as a function, f, of said sensing current flow $i_{sd}$ and said reference current flow $i_r$, at time t, by the relationship $d=f(i_{sd}(t)-i_r)$.

24. The method of claim 18, further comprising the step of deducing the velocity v of said sensing gate region of said moveable suspended mass relative to an unperturbed velocity of said sensing gate region, as a function, g, of said sensing current flow $i_{sd}$, and said reference current flow $i_r$, with respect to time t, by the relationship $v=g(i_{sd}(t)-i_r, di_{sd}/dt)$.

25. The method of claim 18, further comprising the step of deducing the acceleration a of said sensing gate region of said moveable suspended mass relative to an unperturbed acceleration of said sensing gate region, as a function, h, of said sensing current flow $i_{sd}$, and said reference current flow $i_r$, with respect to time t, by the relationship $a=h(i_{sd}(t)-i_r, di_{sd}/dt, d^2i_{sd}/dt^2)$.

26. The method of claim 18, further comprising the step of embodying said sensor in an integrated microchip unit.

27. The method of claim 18, comprising the further steps of:

configuring lengths and widths of said sensing channel and said reference channel to optimize the capacitance and gain of said at least one moveable gate transistor and said reference transistor; and configuring sensing gate regions and reference gate regions of said moveable suspended mass and said static suspended reference mass to be compatible with said optimized transistors.

28. The method of claim 27, comprising the further steps of:

configuring source implants of said transistors with a plurality of fingerlike extensions; and configuring drain implants of said transistors with a similar plurality of fingerlike extensions interdigitating with the fingers of said source implants; and running said channels between said source implants and said drain implants.

* * * * *

UNITED STATES PATENT AND TRADEMARK OFFICE
CERTIFICATE OF CORRECTION

PATENT NO. : 6,220,096 B1  
DATED : April 24, 2001  
INVENTOR(S) : Gutierrez et al.

Page 1 of 1

It is certified that error appears in the above-identified patent and that said Letters Patent is hereby corrected as shown below:

<u>Title page; item [54], and column 1, line 1,</u>
The title of the invention as printed is incorrect.
The correct title should be:

-- "DIFFERENTIAL WIDEBAND VIBRATION SENSOR" --

Signed and Sealed this

Eleventh Day of September, 2001

*Attest:*

*Attesting Officer*

NICHOLAS P. GODICI
*Acting Director of the United States Patent and Trademark Office*